(12) United States Patent
Wallgren

(10) Patent No.: US 11,192,119 B2
(45) Date of Patent: Dec. 7, 2021

(54) HIGH-VOLTAGE POWER SUPPLY SYSTEM

(71) Applicants: Bernt Wallgren, Nol (SE);
KRAFTPOWERCON SWEDEN AB, Surte (SE)

(72) Inventor: Bernt Wallgren, Nol (SE)

(73) Assignee: KRAFTPOWERCON SWEDEN AB, Surte (SE)

( * ) Notice: Subject to any disclaimer, the term of this patent is extended or adjusted under 35 U.S.C. 154(b) by 16 days.

(21) Appl. No.: 16/754,510

(22) PCT Filed: Oct. 9, 2018

(86) PCT No.: PCT/EP2018/077380
§ 371 (c)(1),
(2) Date: Apr. 8, 2020

(87) PCT Pub. No.: WO2019/072786
PCT Pub. Date: Apr. 18, 2019

(65) Prior Publication Data
US 2020/0316612 A1    Oct. 8, 2020

(30) Foreign Application Priority Data
Oct. 9, 2017  (SE) .................................. 17195478.7

(51) Int. Cl.
*B03C 3/68*    (2006.01)
*H02M 3/335*   (2006.01)

(52) U.S. Cl.
CPC ........... *B03C 3/68* (2013.01); *H02M 3/33569* (2013.01)

(58) Field of Classification Search
None
See application file for complete search history.

(56) References Cited

U.S. PATENT DOCUMENTS 4,567,541 A     1/1986   Terai
4,713,093 A  *  12/1987  Hansson ................... B03C 3/68
                                                        96/82

(Continued)

FOREIGN PATENT DOCUMENTS

CN     102500468 A    6/2012
CN     102755931 A   10/2012

OTHER PUBLICATIONS

International Search Report and Written Opinion for PCT application PCT/EP2018/077380 filed Oct. 9, 2018 (published as WO2019072786 on Apr. 18, 2019) that is the parent application to the instant application, dated Jan. 7, 2019, 16 pages.

*Primary Examiner* — Jared Fureman
*Assistant Examiner* — Aqeel H Bukhari
(74) *Attorney, Agent, or Firm* — Harness, Dickey & Pierce, P.L.C.; Anthony G. Fussner

(57) ABSTRACT

A high-voltage power supply system (1) for powering an electrostatic precipitator, ESP (10) is disclosed. The system has an AC supply circuit (2) configured to generate a first and a second AC supply voltage, and two supply circuits (5, 6) connected between the AC supply circuit and the ESP. One of the supply circuits is a DC supply circuit (5) configured to transform and convert the first AC supply voltage to a DC base voltage for the ESP, while the other is a pulse supply circuit having a pulse forming circuit (12) configured to generate and forward high-voltage pulses to the ESP. The AC supply circuit is configured such that each of the AC supply voltages are in the mid frequency range, i.e. in the range of 100 Hz to 5000 Hz. Hereby, a cost effective, low weight and compact high-voltage power supply system is presented.

20 Claims, 4 Drawing Sheets

(56) References Cited

U.S. PATENT DOCUMENTS

| | | | |
|---|---|---|---|
| 5,575,836 A * | 11/1996 | Sugiura | B03C 3/68 96/82 |
| 2001/0011499 A1* | 8/2001 | Reyes | B03C 3/68 95/7 |
| 2014/0168848 A1 | 6/2014 | Ford et al. | |

* cited by examiner

HIGH-VOLTAGE POWER SUPPLY SYSTEM

This patent application is a U.S. national stage filing under 35 U.S.C. § 371 of PCT International Application No. PCT/EP2018/077380 filed Oct. 9, 2018 (published as WO2019/072786 on Apr. 18, 2019), which claims priority to and the benefit of European Application No. 17195478.7 filed Oct. 9, 2017. The entire contents of these applications are incorporated herein by reference.

TECHNICAL FIELD OF THE INVENTION

The present invention relates to the field of electrical power engineering and more specifically to the field of power supplies suitable for supplying electrostatic precipitators (ESPs).

BACKGROUND OF THE INVENTION

Electrostatic precipitators (ESPs) are commonly used for collection and removal of particulate matter from a gas stream in industrial processes. These devices may for example be utilized to filter particulate from the emissions of coal fired power plants, cement factories, steel plants and refuse incineration. Some of the reasons to as why ESPs are one of the more frequently used devices for particulate filtering/collection is that they can handle relatively large gas volumes with a wide range of inlet temperatures, pressures, dust volumes and acid gas conditions. Moreover, they can be used to collect a wide range of particle sizes and they can collect in dry and wet states.

As implied by its name, an ESP uses electrostatic forces to separate dust particles from the gas stream. A conventional ESP has a set of discharge/emitting electrodes, often in the form of thin wires, which are evenly spaced between large plates called collection/collecting electrodes, the emitting electrodes are charged with a high voltage while the collecting electrodes are generally grounded but may be charged with a voltage of opposite polarity. Commonly, a negative, high-voltage (oftentimes pulsating) direct current (DC) is applied to the emitting electrode, creating a negative electric field. In short, the flowing gases are arranged to pass through the negative electric field provided by the emitting electrodes, causing the solid particulate to be negatively charged. The negatively charged particles are subsequently attracted to the collecting electrodes to which they adhere. By shaking or knocking these collection plates, an accumulated mass of "dust" is freed and caused to fall down, under its own weight, into a dust container (hopper) arranged underneath. In more detail, there are other steps in the process such as avalanche multiplication and secondary emission which ionize the gas molecules, which in turn ionize these solid particles and cause a net result of negatively charged particles that are repulsed by the negative electrical field around the emitting electrodes and strongly attracted to the collecting electrode.

High-voltage pulse generators are commonly used in ESPs in order to superimpose voltage pulses on a DC voltage and thereby increase the particle separating or filtering performance. The pulse width typically is in the order of 100 μs and the frequency lies in the range of 1 to 400 pulses/s. The average current can be controlled by varying the pulse repetition frequency of a switching device in the system, while maintain the voltage level applied to the electrostatic precipitator. In this way it is possible to eliminate or at least limit the generation of back corona and the negative effects associated therewith.

The pulse systems are often divided into two main categories, one which is based on switching at high potential/voltage (at the secondary side), and one which will be referred to as pulse transformer systems which are based on switching at low potential (at the primary side). Examples of the latter, where switching takes places on the primary side, can be found in e.g. U.S. Pat. Nos. 4,052,177, 4,600,411 and EP 1 652 586, while EP 1 293 253 discloses an example of high voltage switching (i.e. where the switching takes place on the secondary side).

U.S. Pat. No. 5,575,836 discloses a dust collector with a pulse power supply. In this case, the switching 12 is arranged on the secondary side of a transformer 10. However, it is quite clear that the switching is not performed on the final voltage level. On the contrary, in U.S. Pat. No. 5,575,836 a pulse transformer 16 is required to increase the voltage up to the final level.

However, even though many prior art solutions exist there is always a need for further improvements in the art, particularly for improvements in terms of reduced power losses, reduced size, costs, reduced voltage ripple on the output, and/or robustness/reliability.

SUMMARY OF THE INVENTION

It is therefore an object of the invention to provide a high-voltage power supply system for energizing an electrostatic precipitator, which alleviates all or at least some of the drawbacks associated with presently known systems in terms of power loss, size, cost, reduced voltage ripple on the output and/or robustness/reliability.

This object is achieved by means of a high-voltage power supply system as defined in the appended claims.

In the following, the term exemplary is to be understood as serving as an example, instance or illustration.

According to a first aspect of the present invention, there is provided a power supply system generating high-voltage pulses superimposed on a DC base voltage suitable for powering an electrostatic precipitator. The high voltage power supply system comprises an AC supply circuit configured to generate a first AC supply voltage and a second AC supply voltage, a DC supply circuit connectable (i.e. configured/adapted to be connected to) between the AC supply circuit and the electrostatic precipitator, the DC supply circuit comprising a first transformer and a first rectifier circuit for transforming and converting the first AC supply voltage to the DC base voltage and a pulse supply circuit connectable between the AC supply circuit and the electrostatic precipitator. The pulse supply circuit comprises a second transformer and a second rectifier circuit for transforming and converting the second AC supply voltage to a DC pulse supply voltage, sufficient to generate the high-voltage pulses, and a pulse forming circuit connectable between the second rectifier circuit and the electrostatic precipitator, where the pulse forming circuit is configured to generate (and forward/supply) high-voltage pulses without additional voltage transformation. More specifically, the AC supply circuit is configured such that a frequency of each of the first AC supply voltage and the second AC supply voltage are in the range of 100 Hz to 5000 Hz.

Hereby, a cost effective and compact high-voltage power supply system (may also be referred to as a high-voltage pulse generating system) is presented. The system is particularly suitable for supplying power to an electrostatic precipitator used in gas stream filtering applications. Moreover, the power supply system is lighter and has lower power losses as compared to other known conventional systems.

The present invention is based on the realization that relatively low power losses in the pulse unit tank (i.e. DC supply circuit and in the pulse supply circuit) can be achieved by combining a high voltage switching arrangement with two medium frequency supplies (100 Hz-5000 Hz). In more detail, by feeding the transformers of the DC supply circuit and pulse supply circuit with a medium frequency AC voltage the power losses are reduced due to smaller cores and less winding turns, and consequently less cooling flange area is required on the oil tank (in which the circuits reside), rendering the whole system lighter and smaller. Also, high voltage switching has lower power losses as compared to low voltage switching (such as e.g. systems utilizing pulse transformers). Moreover, the output ripple voltages on the rectified outputs are reduced as compared to low frequency feed (e.g. 50 Hz). Furthermore, the need for a smoothing filter on the high voltage side of the DC supply circuit is partly or completely mitigated for line commutated DC supplies.

Moreover, the present inventor realized that the controlling semiconductors of the AC supply circuit (e.g. Insulated-Gate Bipolar Transistors, IGBTs) can be placed in a control cabinet in a protected indoor environment and the generated medium frequency AC voltage can be supplied via cables to the pulse unit tank (which generally must be held outdoors), wherefore the risk for system malfunction and/or manufacturing cost and complexity is reduced. For higher frequency systems such as Switched Mode Power Supply (SMPS) systems, the IGBTs must generally be placed close to the transformer of the pulse forming circuits and therefore in an outdoor environment.

Further, in accordance with an exemplary embodiment of the present invention, the AC supply circuit comprises a first power inverter configured to convert a DC feed voltage to the first AC supply voltage, a second power inverter configured to convert the DC feed voltage to the second AC supply voltage, where the first power inverter and the second power inverter are configured to control the frequency of each of the first AC supply voltage and the second AC supply voltage to be in the range of 100 Hz to 5000 Hz. The DC feed voltage may for example be generated by means of a three-phase rectifier circuit connected to a three-phase mains (e.g. 380V/480V, 50 Hz/60 Hz). The rectifier circuits may be uncontrolled or controlled and half wave or full wave depending on the specifications and needs for the intended application. The power inverters may for example be full bridge or half bridge single phase inverters using semiconductor switches (e.g. Insulated-Gate Bipolar Transistors, IGBTs or Metal-Oxide-Semiconductor Field-Effect Transistors, MOSFETs). Since the load is an inductive load (transformer), the power inverters may further comprise antiparallel diodes or feedback rectifiers connected across (in parallel with) each semiconductor switch in order to provide a path for peak inductive load current during the switches' off-time. These antiparallel diodes are conventionally integrated in the semiconductor packages.

Further, in accordance with another exemplary embodiment of the present invention, the pulse forming circuit comprises a storage capacitor connected across the second rectifier circuit, a first series inductance and a coupling capacitor connected in series with the storage capacitor, the first series inductance and the coupling capacitor being connected downstream relative to the storage capacitor towards the electrostatic precipitator, and a high voltage switching circuit connected between the storage capacitor and the first series inductance. Moreover, the high voltage switching circuit comprises at least one thyristor, and at least one diode connected in anti-parallel with the at least one thyristor.

In use, the micro pulses are formed by closing the switches of the high voltage switching circuit whereby an oscillation circuit (or resonant circuit) is formed by the storage capacitor, the series inductance, the coupling capacitor and the ESP (which can be approximated as a capacitive load) which causes a rapid voltage increase across the ESP and a corresponding voltage drop across the storage capacitor. Subsequently the current changes direction and the voltage across the ESP decreases (to the voltage level supplied by the DC supply circuit) and the storage capacitor is charged again to approximately the level outputted by the second rectifier circuit, thereby completing one oscillation cycle. The high voltage switching circuit is preferably controlled to generate pulses at a frequency of 2-200 Hz, such as e.g. 50 Hz, 100 Hz or 150 Hz. The switching can be controlled by a suitable ignition circuit connected to e.g. a thyristor or thyristor chain used as switching element(s) in the high voltage switching circuit.

The coupling capacitor is more specifically arranged between the first series inductance and the connecting node of the DC supply circuit (which provides the DC base voltage to the ESP), in order to forward and add the pulse voltage on top of the DC base voltage and also for avoiding short-circuiting of the DC supply by the pulse supply.

Even further, in accordance with another exemplary embodiment of the present invention, the pulse forming circuit comprises auxiliary circuit connected in parallel with the high voltage switching circuit and the storage capacitor, the auxiliary circuit being connected between the high voltage switching circuit and the first series inductance, the auxiliary circuit including a protective branch comprising a first resistance and a series diode for limiting voltage peaks across the high voltage switching circuit. In other words, the protective branch has one terminal connected to a node/junction between the high voltage switching circuit and the series inductance and the other terminal is grounded. The series diode and resistance serve to limit voltage peaks across the high voltage switching circuit during spark generation in the ESP.

Yet further, in accordance with yet another embodiment of the present invention, the pulse forming circuit comprises an auxiliary circuit connected in parallel with the high voltage switching circuit and the storage capacitor, the auxiliary circuit being connected between the high voltage switching circuit and the first series inductance, the auxiliary circuit including a restoring branch comprising a second resistance and a second series inductance for restoring a charge of the coupling capacitor between pulses. In other words, the restoring branch has one terminal connected to a node/junction between the high voltage switching circuit and the series inductance and the other terminal is grounded. Naturally, the above two exemplary embodiments may be combined and the pulse forming circuit may comprise an auxiliary circuit having the protective branch and the restoring branch. In order to improve the capability of restoring the voltage across the coupling capacitor to the same values as the DC base voltage, the second series inductance is preferably arranged to have a relatively high inductance value in the range of 0.1 Henry to 10 Henry, and preferably higher than 1 Henry.

In accordance with yet another exemplary embodiment of the present invention, the frequency of each of said first AC supply voltage and said second AC supply voltage is in the range of 200 Hz to 2000 Hz, such as for example 200 Hz to 600 Hz. Within the first frequency range (200-2000 Hz) a good trade-off between output voltage ripple and transformer power losses is achieved. However, for most conventional transformer designs the latter frequency range (200 to 600 Hz) is preferred.

Still further, in accordance with another exemplary embodiment of the present invention, the high-voltage power supply system further comprises a first series capacitor connected between said first power inverter and said first transformer of the DC supply circuit, and a second series capacitor connected between said second power inverter and said second transformer of the pulse supply circuit. By adding capacitors on the primary side of the transformers, a series resonant circuit is formed which allows for any semiconductor switches used in the AC circuit (e.g. IGBTs in the power inverters) to turn off at lower current magnitudes which puts less strain on the IGBTs and furthermore reduces output voltage ripple. In more detail, when there is only an inductive load (transformer windings) in the circuit, the current in the circuit increases continuously until it is turned off by the semiconductor switches (current will have a saw tooth waveform). By adding the series capacitors, the circuit will form a series resonant circuit. At full power the rectified current will then be of a half wave sinus shape wherefore the semiconductor switches can turn off at lower current magnitudes. Moreover, the series capacitors protect the transformers from any unwanted DC components (e.g. in case of erroneous controlling), which may result in problems with high primary saturation currents.

Further, in accordance with yet another exemplary embodiment, the frequency of the first AC supply voltage is higher than the frequency of the second AC supply voltage. For example, the AC supply voltage forwarded to the DC supply circuit (first AC supply voltage) may have a frequency of 400 Hz and the frequency of the AC supply voltage forwarded to the pulse supply circuit (the second AC supply voltage) may have a frequency of 200 Hz. Unwanted acoustic noise can be reduced by using a frequency in the range between 400 and 700 Hz since a primary choke (a large contributor to noise in the circuit) can be omitted since the leakage inductance of the primary winding of the transformer provides enough inductance and thereby mitigating the need for a primary choke. Naturally, in other example embodiments of the present invention the two frequencies may be the same.

These and other features of the present invention will in the following be further clarified with reference to the embodiments described hereinafter.

BRIEF DESCRIPTION OF THE DRAWINGS

For exemplifying purposes, the invention will be described in closer detail in the following with reference to embodiments thereof illustrated in the attached drawings, wherein.

DETAILED DESCRIPTION

In the following detailed description, preferred embodiments of the present invention will be described. However, it is to be understood that features of the different embodiments are exchangeable between the embodiments and may be combined in different ways, unless anything else is specifically indicated. Even though in the following description, numerous specific details are set forth to provide a more thorough understanding of the present invention, it will be apparent to one skilled in the art that the present invention may be practiced without these specific details. In other instances, well known constructions or functions are not described in detail, so as not to obscure the present invention.

Figure 1:
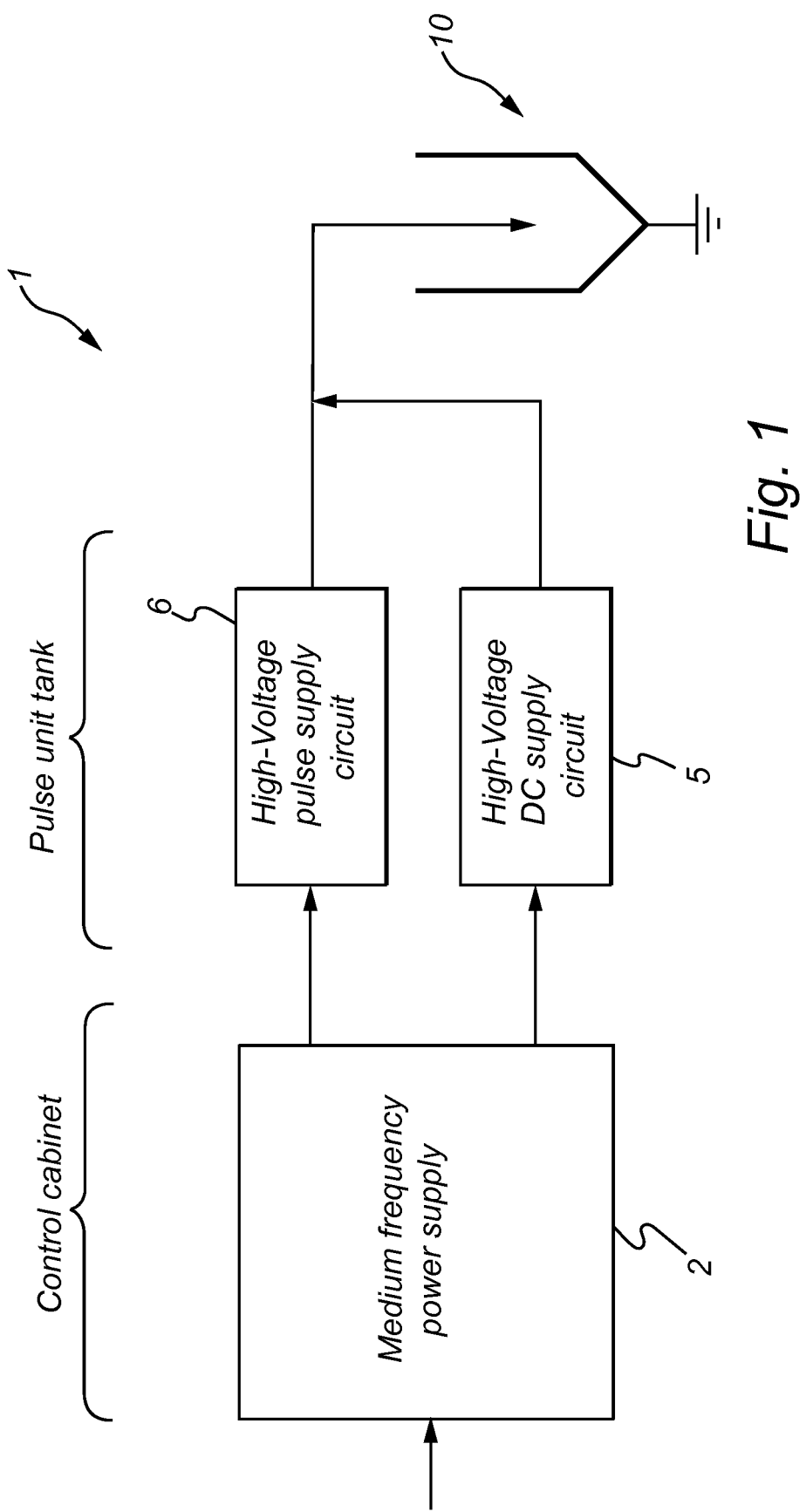
FIG. 1 illustrates a schematic block diagram of a high-voltage power supply system for powering an electrostatic precipitator, in accordance with an embodiment of the present invention.

FIG. 1 is a schematic block diagram of a high-voltage (pulsed) power supply system 1, particularly suitable for powering an electrostatic precipitator (ESP) 10. The system 1 can be divided into two parts, a pulse unit tank 5, 6 and a control cabinet 2 where the control cabinet can be understood as a controllable AC supply circuit configured to generate a supply voltage to the pulse unit tank which in turn transforms this supply voltage to a suitable level in order to power the ESP 10. More specifically, the pulse unit tank comprises a high-voltage pulse supply circuit 6 and a high-voltage DC supply circuit 5 whereby the pulse unit tank is arranged to supply a high DC base voltage (e.g. magnitude in the range of 20 kV to 150 kV) with superimposed high-voltage micro pulses (magnitude in the range of e.g. 40 kV to 120 kV) at a rate of 2 to 200 pulses/s, preferably 100 pulses/s. Generally, the voltage applied to the discharge electrode (of the ESP) is of a negative polarity, wherefore the preceding voltage ranges may be understood as ranging from −20 kV to −150 kV for the DC base voltage and from −40 kV to −120 kV for the micro pulses.

The AC supply circuit 2 is configured to generate a first AC supply voltage and a second AC supply voltage for the DC supply circuit 5 and the pulse supply circuit 6 respectively. The frequency AC supply voltages is within the medium frequency range, i.e. between 100 Hz and 5000 Hz, preferably in the range of 200 Hz and 2000 Hz. By using this arrangement (medium frequency supply together with a high-voltage switching circuit) advantages in terms of low losses, reduced tank size and weight, reduced manufacturing costs, etc. may be achieved. Moreover, the AC supply circuit 2, and more specifically the semiconductor switches (e.g. IGBTs) of the AC supply circuit, which are configured to control the output voltage frequency, can be positioned within a control cabinet in a protected environment, as opposed to prior known systems using an AC feed utilizing higher frequencies which must be placed closed to the transformer(s) which is/are arranged outdoors in relatively harsh environments.

Figure 2:
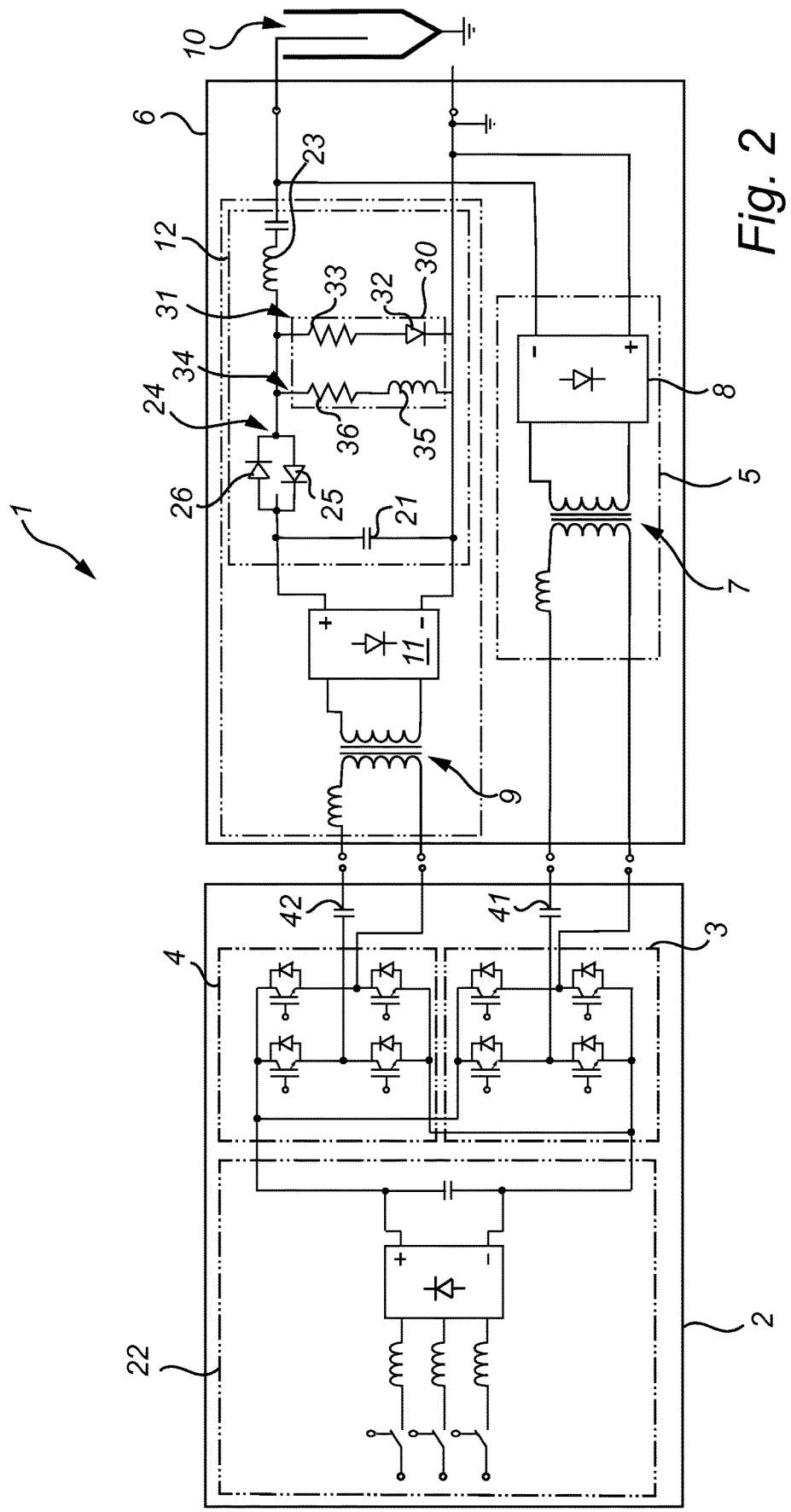
FIG. 2 illustrates a schematic circuit representation of a high-voltage power supply system for powering an electrostatic precipitator in accordance with an embodiment of the present invention.

FIG. 2 is a schematic circuit representation of a high-voltage power supply system 1 in accordance with an exemplary embodiment of the present invention. In reference to this drawing, further details of the system's 1 sub units and their functional aspects will be described. The high-voltage power supply system 1 comprises an AC supply circuit 2 which is configured to generate a first AC supply voltage and a second AC supply voltage. In more detail, the AC supply circuit 2 includes a first power inverter 3 and a second power inverter 4 configured to convert a DC feed voltage to the first and second AC supply voltages respectively. The DC feed voltage is generated by means of DC supply circuit 22 comprising a three-phase rectifier bridge connected to AC mains (e.g. 380V/50 Hz). Naturally, there are other ways to provide a suitable DC feed voltage to the power inverters 3, 4 that are within the skilled artisan's general knowledge (e.g. using a single phase supply instead of a three phase, connecting the inverters directly to a DC source, etc.) and will therefore for the sake of brevity be omitted.

Each of the power inverters 3, 4 comprises a set of IGBTs with an anti-parallel diode connected across each transistor, arranged in a full bridge configuration. However, other topologies commonly used in high power applications are feasible, such as e.g. half bridge inverters. Even though IGBTs are shown in the illustrated example, other semiconductors switches are applicable such as e.g. MOSFETs, BJTs, etc.

Further, the high-voltage power supply system 1 has a DC supply circuit 5 connected to the output of the first power inverter 3. The DC supply circuit 5 includes a first transformer 7 and a first rectifier circuit 8 for transforming and converting the first AC supply voltage to a DC base voltage (magnitude in the range of 20 kV to 150 kV) for the ESP 10. The negative electrode (i.e. having a negative potential $U_B$) of the first rectifier circuit 8 is connected to the discharge/ emitter electrode of the ESP, while the positive electrode is grounded.

Moreover, a pulse supply circuit 6 is connected between the output of the second power inverter 4 and the ESP 10, where the pulse supply circuit has a second transformer 9 and a second rectifier circuit 11 for transforming and converting the second AC supply voltage to a DC pulse supply voltage (magnitude is e.g. in the range of 40 kV to 120 kV). The positive terminal of the second rectifier circuit 12 is grounded while the negative terminal (having a negative potential $U_C$) of the second rectifier circuit 11 is connected to the discharge/emitter electrode of the ESP 10 via a number of components 23, 24, 27 included in the pulse forming circuit 12. The pulse forming circuit 12 is then configured to generate high-voltage pulses for the ESP 10 (the pulses are accordingly superimposed on the DC base voltage $U_B$).

Still further, the system 1 comprises a pair of optional series capacitors 41, 42, namely a first series capacitor 41 connected between the first power inverter 3 and the first transformer 7 of the DC supply circuit 5, and a second series capacitor connected between the second power inverter 3 and the second transformer 9 of the pulse supply circuit 6. The series capacitors 41, 42 form a series resonant circuit together with the leakage inductance of the transformers 7, 9 and any potential primary chokes, why the IGBTs can be controlled so that they turn off at lower current magnitudes thereby reducing power losses and increasing the lifespan of the IGBTs. Moreover, output ripple can be reduced by employing the series capacitors 41, 42.

Moving on, the pulse supply circuit 6 comprises a pulse forming circuit 12, connected between the second rectifier circuit 11 and the ESP 10. The pulse forming circuit is configured to generate and forward high-voltage pulses to the ESP 10. The pulse forming circuit may be configured such that the pulse repetition frequency in the range of 2-200 Hz, each pulse for example having a pulse width in the range of 50 to 150 μs. The pulse repetition frequency is suitably controlled by means of a control circuit or ignition circuit connected to the switching element(s) of the high voltage switching circuit 24, however this will be discussed in more detail in the following.

The pulse forming circuit 12 has a storage capacitor 21 connected in parallel with the second rectifier circuit 11, i.e. between the negative (output) terminal and the positive terminal of the second rectifier circuit 11, or between the negative terminal of the second rectifier circuit and ground. Thus, the voltage across the storage capacitor 21 is charged to the same level as the DC output of the second rectifier circuit 11, in this case, $U_C$. Connected in series between the negative terminal of the storage capacitor 21 and the ESP 10 is a first series inductance 23 and a high voltage switching circuit 24. The high voltage switching circuit 24 comprises an anti-parallel coupling of a thyristor 25 or a thyristor chain and a diode 26 or diode chain. In other words, the thyristor (s) and the diode(s) is/are connected in mutually oppositely conducting directions in order to enable the diode or diodes to have a blocking effect on current heading towards the second rectifier circuit 11 when the thyristor(s) is/are off. Component chains are used in order to be able to handle the high voltages in the circuit without burning or destroying the components.

Figure 3A:
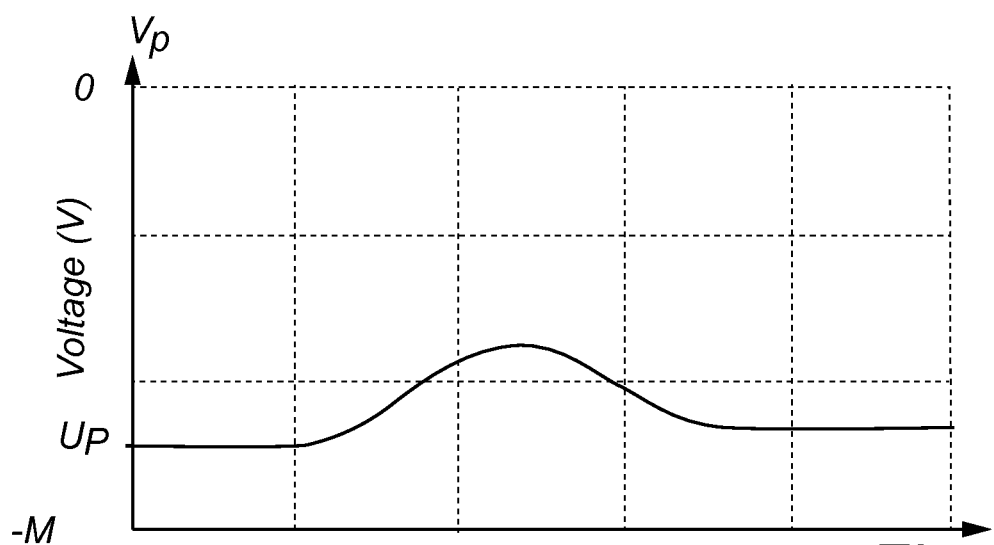
FIG. 3A illustrates a schematic waveform representing the voltage across a storage capacitor of a pulse forming circuit during an oscillation cycle in accordance with an embodiment of the present invention.
Figure 3B:
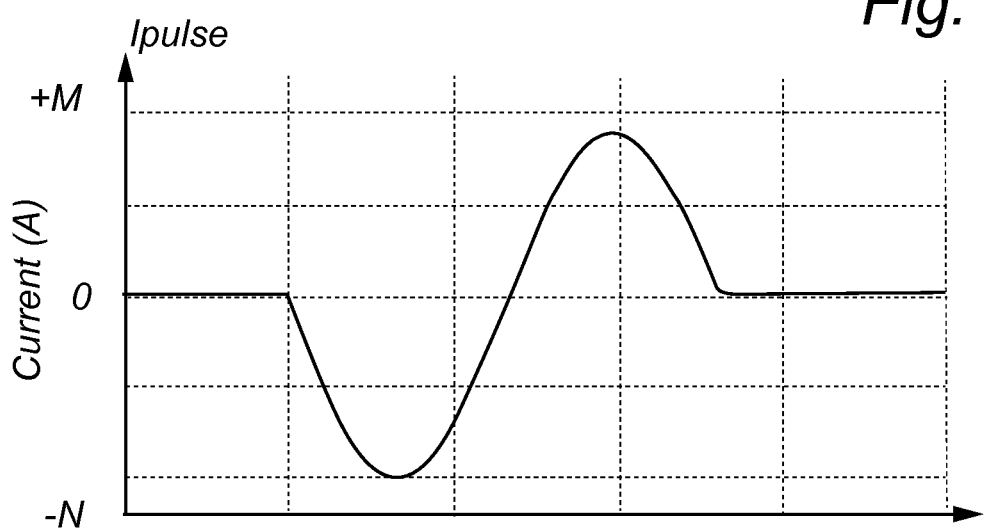
FIG. 3B illustrates a schematic waveform representing the current in a pulse supply circuit and into the ESP during an oscillation cycle in accordance with an embodiment of the present invention.
Figure 3C:
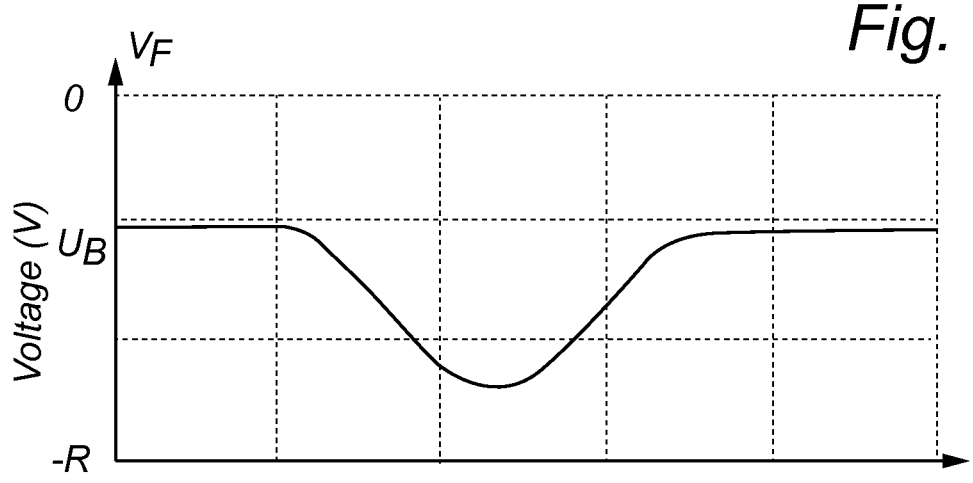
FIG. 3C illustrates a schematic waveform representing the voltage across an ESP connected to a high voltage power supply system during an oscillation cycle in accordance with an embodiment of the present invention.

A control circuit or firing circuit (not shown) is used to fire the thyristor(s) at a predefined frequency in order to monotonously form a series resonant circuit causing a sudden increase in voltage, $V_{ESP}$, across the ESP, (i.e. the negative potential of the discharge electrode is increased) and a corresponding decrease in voltage, $V_C$, across the storage capacitor 21. This is schematically illustrated in the waveforms shown in FIGS. 3A and 3C, where FIG. 3A shows the voltage across the storage capacitor 21 over time, and more specifically during an oscillation cycle, and FIG. 3C shows the voltage across the ESP 10 during an oscillation cycle. Moreover, FIG. 3B illustrates the current flowing through the pulse forming circuit 12 and into the ESP 10 during an oscillation cycle.

Reverting back to FIG. 2, the pulse forming circuit 12 also has a coupling capacitor 27 connected in series between the first series inductance 23 and the discharge electrode of the ESP 10. The coupling capacitor 27 aids to forward and add the pulse voltage on top of the DC base voltage and also to mitigate the risk of short circuiting the DC supply 5 by means of the pulse supply 6.

Further, the pulse forming circuit 12 includes an optional auxiliary circuit 30 connected in parallel with the high voltage switching circuit 24 and the storage capacitor 21. Stated differently, the auxiliary circuit 30 has one terminal connected between the high voltage switching circuit 24 and the first series inductance 23 and the other terminal connected to ground. The auxiliary circuit 30 here has two parallel branches 31, 34, where each branch has one terminal connected to a node between the high voltage switching circuit 24 and the first series inductance 23 and the other terminal connected to ground. One of the branches is denoted as a protective branch 31 which includes a first series resistance 33 and a series diode 32 for limiting voltage peaks across the high voltage switching circuit 24. The auxiliary circuit 30 further has an optional restoring branch 34 including a second series resistance 36 and a second series inductance 35 in order to restore a charge of the coupling capacitor 27 between pulses. Preferably, the second series inductance has a relatively high inductance value, e.g. in the range of 0.1 H to 10 H, such as e.g. 1 H.

It is noted that other examples of auxiliary circuits 30 are possible. In particular, the auxiliary circuit may be simplified, and include e.g. only a restoring branch, which may include only an inductance or only a resistor.

Figure 4:
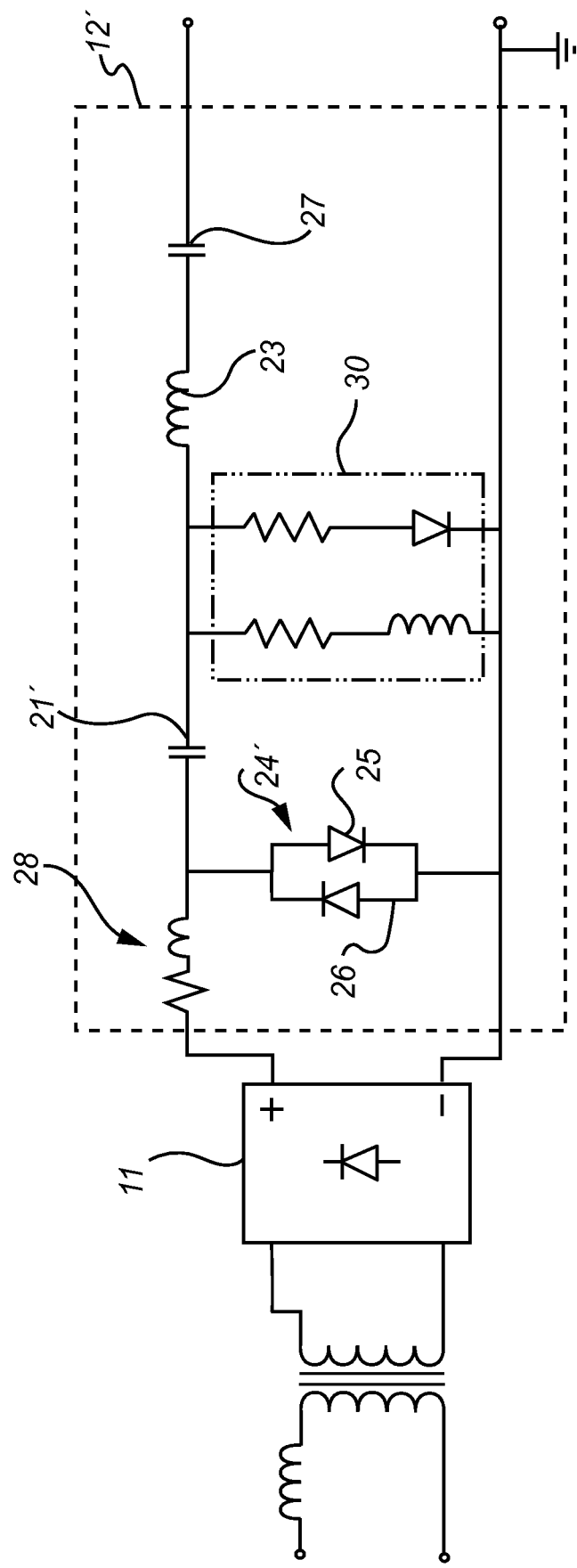
FIG. 4 is a schematic block diagram of an alternative embodiment of the pulse supply circuit in FIG. 2.

FIG. 4 shows an alternative embodiment of the pulse forming circuit 12'. The components are substantially the same as in the circuit 12 in FIG. 2, with some differences.

The rectifier 11 is here connected to provide a positive supply voltage. Further, the storage capacitor 21' and the high voltage switching circuit 24' have changed position, such that the switching circuit 24 is connected in parallel with the rectifier 11, i.e. between the rectified outputs. With this solution, an additional impedance 28, here an inductance in series with a resistance, is required between the rectifier output and the storage capacitor 21'.

The protective branch 31 and the restoring branch 34 maybe connected in the same way as in FIG. 2, i.e. in parallel with the storage capacitor 21' and switching circuit 24'.

Even though the invention has been described with reference to specific exemplifying embodiments thereof, many different alterations, modifications and the like will become apparent for those skilled in the art. For example, each of the power inverters 3, 4 may have their own separate feeds with a rectifier circuit and DC-link capacitor. The DC feed circuit 22 may for example be supplied by a single phase AC instead of a three-phase AC. Such and other obvious variations to the disclosed embodiments can be understood and effected by the skilled addressee in practicing the claimed invention, from a study of the drawings, the disclosure, and the appended claims. Furthermore, in the claims, the word "comprising" does not exclude other elements or steps, and the indefinite article "a" or "an" does not exclude a plurality.

The invention claimed is:

1. A power supply system for generating high-voltage pulses superimposed on a DC base voltage suitable for powering an electrostatic precipitator, said power supply system comprising:
    an AC supply circuit configured to generate a first AC supply voltage and a second AC supply voltage;
    a DC supply circuit connectable between said AC supply circuit and said electrostatic precipitator, said DC supply circuit comprising a first transformer and a first rectifier circuit for transforming and converting said first AC supply voltage to said DC base voltage;
    a pulse supply circuit connectable between said AC supply circuit and said electrostatic precipitator, said pulse supply circuit comprising:
        a second transformer and a second rectifier circuit for transforming and converting said second AC supply voltage to a DC pulse supply voltage in the range 40 kilovolts (kV) to 120 kV, sufficient to generate said high-voltage pulses;
        a pulse forming circuit connectable between said second rectifier circuit and said electrostatic precipitator, said pulse forming circuit being configured to generate said high-voltage pulses without additional voltage transformation, said pulse transforming circuit including a high voltage switching circuit comprising an anti-parallel coupling of a chain of diodes and a chain of thyristors;
    wherein said AC supply circuit is configured such that a frequency of each of said first AC supply voltage and said second AC supply voltage are in the range of 100 Hertz (Hz) to 5000 Hz.

2. The high-voltage power supply system according to claim 1, wherein said pulse forming circuit comprises at least one thyristor, and at least one diode connected in anti-parallel with said at least one thyristor.

3. The high-voltage power supply system according to claim 1, wherein said AC supply circuit comprises:
    a first power inverter configured to convert a DC feed voltage to said first AC supply voltage;
    a second power inverter configured to convert said DC feed voltage to said second AC supply voltage; and
    wherein said first power inverter and said second power inverter are configured to control the frequency of each of said first AC supply voltage and said second AC supply voltage to be in the range of 100 Hz to 5000 Hz.

4. The high-voltage power supply system according to claim 3, wherein said first power inverter is a full bridge or half bridge single phase inverter including semiconductor power switches.

5. The high-voltage power supply system according to claim 3, wherein said first power inverter is a full bridge or half bridge single phase inverter including IGBT or MOFSET semiconductor power switches.

6. The high-voltage power supply system according to claim 3, wherein said second power inverter is a full bridge or half bridge single phase inverter including semiconductor power switches.

7. The high-voltage power supply system according to claim 3, wherein said second power inverter is a full bridge or half bridge single phase inverter including IGBT or MOFSET semiconductor power switches.

8. The high-voltage power supply system according to claim 1, wherein said DC base voltage and said high voltage pulses are connected in parallel at an output of said power supply system.

9. The high-voltage power supply system according to claim 1, wherein the frequency of each of said first AC supply voltage and said second AC supply voltage is in the range of 200 Hz to 2000 Hz.

10. The high-voltage power supply system according to claim 1, further comprising a first series capacitor connected between said first power inverter and said first transformer of the DC supply circuit, and a second series capacitor connected between said second power inverter and said second transformer of the pulse supply circuit.

11. The high-voltage power supply system according to claim 1, wherein the frequency of said first AC supply voltage is higher than the frequency of said second AC supply voltage.

12. The high-voltage power supply system according claim 1, connected to an electrostatic precipitator.

13. The high-voltage power supply system according claim 1, wherein said pulse forming circuit comprises:
    a storage capacitor connected between output terminals of the second rectifier circuit;
    a first series inductance and a coupling capacitor connected in series to an output of the power supply system; and
    a high voltage switching circuit connected in series between the storage capacitor and the first series inductance.

14. The high-voltage power supply system according claim 1, wherein said pulse forming circuit further comprises a restoring branch connected in parallel with a high voltage switching circuit and a storage capacitor, said restoring branch comprising a second resistance and a second series inductance for restoring a charge of a coupling capacitor between pulses.

15. A power supply system for generating high-voltage pulses superimposed on a DC base voltage suitable for powering an electrostatic precipitator, said power supply system comprising:
- an AC supply circuit configured to generate a first AC supply voltage and a second AC supply voltage;
- a DC supply circuit connectable between said AC supply circuit and said electrostatic precipitator, said DC supply circuit comprising a first transformer and a first rectifier circuit for transforming and converting said first AC supply voltage to said DC base voltage;
- a pulse supply circuit connectable between said AC supply circuit and said electrostatic precipitator, said pulse supply circuit comprising:
  - a second transformer and a second rectifier circuit for transforming and converting said second AC supply voltage to a DC pulse supply voltage, sufficient to generate said high-voltage pulses;
  - a pulse forming circuit connectable between said second rectifier circuit and said electrostatic precipitator, said pulse forming circuit being configured to generate said high-voltage pulses without additional voltage transformation;
- wherein said AC supply circuit is configured such that a frequency of each of said first AC supply voltage and said second AC supply voltage are in the range of 100 Hertz (Hz) to 5000 Hz;
- wherein said DC base voltage and said high voltage pulses are connected in parallel at an output of said power supply system;
- wherein said pulse forming circuit comprises:
  - a storage capacitor connected between output terminals of the second rectifier circuit;
  - a first series inductance and a coupling capacitor connected in series to the output of the power supply system; and
  - a high voltage switching circuit connected in series between the storage capacitor and the first series inductance.

16. The high-voltage power supply system according to claim 8, wherein said pulse forming circuit comprises:
- a high voltage switching circuit connected between output terminals of the second rectifier circuit;
- a first series inductance and a coupling capacitor connected in series to the output of the power supply system; and
- a storage capacitor connected in series between the high voltage switching circuit and the first series inductance.

17. The high-voltage power supply system according to claim 15, wherein said high voltage switching circuit comprises at least one thyristor, and at least one diode connected in anti-parallel with said at least one thyristor.

18. The high-voltage power supply system according to claim 15, wherein said pulse forming circuit further comprises a protective branch connected in parallel with said high voltage switching circuit and said storage capacitor, said protective branch comprising a first resistance and a series diode for limiting voltage peaks across the high voltage switching circuit.

19. A power supply system for generating high-voltage pulses superimposed on a DC base voltage suitable for powering an electrostatic precipitator, said power supply system comprising:
- an AC supply circuit configured to generate a first AC supply voltage and a second AC supply voltage;
- a DC supply circuit connectable between said AC supply circuit and said electrostatic precipitator, said DC supply circuit comprising a first transformer and a first rectifier circuit for transforming and converting said first AC supply voltage to said DC base voltage;
- a pulse supply circuit connectable between said AC supply circuit and said electrostatic precipitator, said pulse supply circuit comprising:
  - a second transformer and a second rectifier circuit for transforming and converting said second AC supply voltage to a DC pulse supply voltage, sufficient to generate said high-voltage pulses;
  - a pulse forming circuit connectable between said second rectifier circuit and said electrostatic precipitator, said pulse forming circuit being configured to generate said high-voltage pulses without additional voltage transformation;
- wherein said AC supply circuit is configured such that a frequency of each of said first AC supply voltage and said second AC supply voltage are in the range of 100 Hertz (Hz) to 5000 Hz;
- wherein said AC supply circuit comprises:
  - a first power inverter configured to convert a DC feed voltage to said first AC supply voltage;
  - a second power inverter configured to convert said DC feed voltage to said second AC supply voltage; and
- wherein said first power inverter and said second power inverter are configured to control the frequency of each of said first AC supply voltage and said second AC supply voltage to be in the range of 100 Hz to 5000 Hz;
- wherein said first power inverter is a full bridge or half bridge single phase inverter including IGBT or MOFSET semiconductor power switches; and
- wherein said pulse forming circuit further comprises a restoring branch connected in parallel with a high voltage switching circuit and a storage capacitor, said restoring branch comprising a second resistance and a second series inductance for restoring a charge of a coupling capacitor between pulses.

20. The high-voltage power supply system according to claim 19, wherein said second series inductance has an inductance value in the range of 0.1H to 10 H.

* * * * *